US012750763B2

(12) United States Patent
Shim

(10) Patent No.: US 12,750,763 B2
(45) Date of Patent: Sep. 29, 2026

(54) ELECTRONIC DEVICE SUPPORTING NAN CONNECTION AND P2P CONNECTION, TERMINAL DEVICE AND CONTROLLING METHOD THEREFOR

(71) Applicant: SAMSUNG ELECTRONICS CO., LTD., Suwon-si (KR)

(72) Inventor: Sangu Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 408 days.

(21) Appl. No.: 18/238,936

(22) Filed: Aug. 28, 2023

(65) Prior Publication Data

US 2024/0137840 A1 Apr. 25, 2024
US 2024/0236815 A9 Jul. 11, 2024

Related U.S. Application Data

(63) Continuation of application No. PCT/KR2023/011196, filed on Aug. 1, 2023.

(30) Foreign Application Priority Data

Oct. 24, 2022 (KR) ........................ 10-2022-0137703

(51) Int. Cl.

| | |
|---|---|
| ***H04W 4/00*** | (2018.01) |
| ***H04W 8/00*** | (2009.01) |
| ***H04W 40/24*** | (2009.01) |

(52) U.S. Cl.

CPC ......... *H04W 40/246* (2013.01); *H04W 8/005* (2013.01)

(58) Field of Classification Search

CPC ... H04W 40/246; H04W 8/005; H04W 40/24; H04W 8/00

(Continued)

(56) References Cited

U.S. PATENT DOCUMENTS 10,021,644 B2 7/2018 Patil et al.
10,064,042 B2 8/2018 Aoki
(Continued)

FOREIGN PATENT DOCUMENTS

KR 10-2016-0138979 A 12/2016
KR 10-2019-0129804 A 11/2019
(Continued)

OTHER PUBLICATIONS

International Search Report (PCT/ISA/210) issued on Nov. 21, 2023 by the International Searching Authority in International Patent Application No. PCT/KR2023/011196.
(Continued)

*Primary Examiner* — Marceau Milord
(74) *Attorney, Agent, or Firm* — Sughrue Mion, PLLC

(57) ABSTRACT

An electronic device includes: a communication interface; and at least one processor configured to: maintain an inactivated state of a Peer-to-Peer (P2P) engine, and control a Neighbor Awareness Networking (NAN) engine in an activated state, generate sync complex data for a terminal device to search for the electronic device, by adding P2P Information Element (IE) data to sync beacon data, and control the communication interface to output the sync complex data using a predetermined cycle in a predetermined discovery window section through a discovery window channel.

12 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,080,182 | B2 | 9/2018 | Kim et al. | |
| 10,349,455 | B2 * | 7/2019 | Park | H04W 72/1263 |
| 10,470,027 | B2 | 11/2019 | Aoki | |
| 11,228,890 | B2 | 1/2022 | Choi et al. | |
| 11,546,748 | B2 | 1/2023 | Oh et al. | |
| 11,601,793 | B2 | 3/2023 | Choi et al. | |
| 11,706,128 | B2 * | 7/2023 | Kwon | H04L 45/24 370/329 |
| 11,743,714 | B2 * | 8/2023 | Kurian | H04W 40/248 370/329 |
| 11,792,757 | B2 * | 10/2023 | Petrus | H04W 24/10 370/336 |
| 11,812,399 | B2 * | 11/2023 | Li | H04W 76/15 |
| 11,889,571 | B2 * | 1/2024 | Inoue | H04W 84/12 |
| 11,889,581 | B2 | 1/2024 | Oh et al. | |
| 12,167,481 | B2 * | 12/2024 | Yi | H04W 12/06 |
| 12,192,313 | B2 * | 1/2025 | Li | H04L 63/083 |
| 2015/0319235 | A1 * | 11/2015 | Liu | H04L 69/329 709/204 |
| 2015/0358800 | A1 * | 12/2015 | Park | H04W 76/27 370/311 |
| 2016/0128113 | A1 * | 5/2016 | Qi | H04L 67/51 370/329 |
| 2016/0198494 | A1 * | 7/2016 | Huang | H04L 67/51 370/329 |
| 2016/0205529 | A1 * | 7/2016 | Oren | H04W 8/005 370/336 |
| 2016/0227535 | A1 * | 8/2016 | Sharma | H04W 72/1215 |
| 2016/0269486 | A1 * | 9/2016 | Gupta | H04L 67/12 |
| 2016/0270056 | A1 * | 9/2016 | Gupta | H04W 72/0446 |
| 2016/0309462 | A1 * | 10/2016 | Huang | H04W 48/16 |
| 2017/0034769 | A1 | 2/2017 | Kim et al. | |
| 2017/0094496 | A1 | 3/2017 | Aoki | |
| 2017/0208559 | A1 * | 7/2017 | Tamura | H04W 8/005 |
| 2017/0245276 | A1 * | 8/2017 | Kim | H04W 76/14 |
| 2018/0042059 | A1 * | 2/2018 | Park | H04W 8/005 |
| 2018/0242135 | A1 * | 8/2018 | Lee | H04W 8/005 |
| 2018/0249111 | A1 * | 8/2018 | Kim | H04L 67/104 |
| 2018/0332459 | A1 | 11/2018 | Aoki | |
| 2020/0252864 | A1 | 8/2020 | Yoshikawa | |
| 2021/0127244 | A1 | 4/2021 | Choi et al. | |
| 2021/0127249 | A1 | 4/2021 | Oh et al. | |
| 2021/0282119 | A1 * | 9/2021 | Asterjadhi | H04W 76/40 |
| 2022/0116759 | A1 | 4/2022 | Choi et al. | |
| 2022/0116767 | A1 * | 4/2022 | Kurian | H04W 40/248 |
| 2022/0182453 | A1 | 6/2022 | Jung et al. | |
| 2022/0247642 | A1 * | 8/2022 | Cheong | H04L 67/12 |
| 2022/0286988 | A1 * | 9/2022 | Petrus | H04W 24/10 |
| 2022/0361095 | A1 | 11/2022 | Jung et al. | |
| 2023/0132947 | A1 | 5/2023 | Oh et al. | |
| 2024/0129705 | A1 | 4/2024 | Oh et al. | |
| 2024/0171960 | A1 | 5/2024 | Oh et al. | |

FOREIGN PATENT DOCUMENTS

| | | | |
|---|---|---|---|
| KR | 10-2021-0039643 | A | 4/2021 |
| KR | 10-2021-0050353 | A | 5/2021 |
| KR | 10-2021-0050390 | A1 | 5/2021 |
| KR | 10-2021-0097544 | A | 8/2021 |
| KR | 10-2022-0061349 | A | 5/2022 |

OTHER PUBLICATIONS

Written Opinion (PCT/ISA/237) issued on Nov. 21, 2023 by the International Searching Authority in International Patent Application No. PCT/KR2023/011196.

* cited by examiner

FIG. 7B

P2P IE format

| Field | Size (octets) | Value (Hexadecimal) | Description |
|---|---|---|---|
| Element ID | 1 | 0xDD | IEEE 802.11 vendor specific usage. |
| Length | 1 | variable | Length of the following fields in the IE in octets. The Length field is a variable, and set to 4 plus the total length of P2P attributes. |
| OUI | 3 | 50 6F 9A | WFA specific OUI. |
| OUI Type | 1 | 0x09(to be assigned) | Identifying the type or version of P2P IE. Setting to 0x09 indicates Wi-Fi Alliance P2P v1.0. |
| P2P Attributes | variable | | One of more P2P attributes appear in the P2P IE. |

ELECTRONIC DEVICE SUPPORTING NAN CONNECTION AND P2P CONNECTION, TERMINAL DEVICE AND CONTROLLING METHOD THEREFOR

CROSS-REFERENCE TO RELATED APPLICATIONS

This application is a by-pass continuation of International Application No. PCT/KR2023/011196, filed on Aug. 1, 2023, which is based on an claims priority to Korean Patent Application No. 10-2022-0137703, filed on Oct. 24, 2022, at the Korean Intellectual Property Office, the disclosures of each which are incorporated by reference herein in their entireties.

BACKGROUND

1. Field

The disclosure relates to an electronic device and a controlling method therefor, and more particularly, to an electronic device supporting Neighbor Awareness Networking (NAN) connection and Peer-to-Peer (P2P) connection, and a controlling method therefor.

2. Description of Related Art

With the development of electronic technologies, various electronic devices are being used. In some cases, electronic devices that are recently used are newly developed electronic devices. Or, in some cases, electronic devices that are recently used are devices that are performing mechanical operations, but can be classified as electronic devices as they include electronic components.

For example, electronic devices may include home appliances such as a refrigerator, a washing machine, a dryer, an air conditioner, a television (TV), a microwave oven, an electric range, an air dresser, etc. for the convenience of home life. Also, electronic devices may include a desktop computer, a laptop computer, a smartphone, a tablet personal computer (PC), etc. performing various functions. Alternatively, electronic devices may include a device such as a server storing and swiftly processing data of high capacity.

In the past, an electronic device generally performed a function independently. However, with the development of communication technologies, there are increasing cases wherein various electronic devices are communicatively connected and perform functions in collaboration. Also, various methods are being used for communication methods of connecting various electronic devices.

For example, among Wi-Fi communication methods, there is a Wi-Fi Direct method and a Wi-Fi Aware method. The Wi-Fi Direct method is also referred to as a Peer-to-Peer (P2P) method, and the Wi-Fi Aware method is also referred to as a Neighbor Awareness Networking (NAN) method. Also, among electronic devices, there are devices supporting the P2P method, and there are devices supporting the NAN method. Alternatively, there are electronic devices supporting both the P2P method and the NAN method.

SUMMARY

According to an aspect of the disclosure, an electronic device includes: a communication interface; and at least one processor configured to: maintain an inactivated state of a Peer-to-Peer (P2P) engine, and control a Neighbor Awareness Networking (NAN) engine in an activated state, generate sync complex data for a terminal device to search for the electronic device, by adding P2P Information Element (IE) data to sync beacon data, and control the communication interface to output the sync complex data using a predetermined cycle in a predetermined discovery window section through a discovery window channel.

The at least one processor may be further configured to: generate discovery complex data for the electronic device to search for the terminal device, by adding P2P IE data to discovery beacon data, and control the communication interface to output the discovery complex data through the discovery window channel.

The at least one processor may be further configured to add the P2P IE data to a rear end of the sync beacon data or a rear end of the discovery beacon data.

The at least one processor may be further configured to synchronize the discovery window channel and a P2P listen channel.

The at least one processor may be further configured to: based on receiving, from the terminal device through the communication interface, an NAN service request, perform NAN connection with the terminal device using the NAN engine, and based on receiving, from the terminal device through the communication interface, a P2P service request, activate the P2P engine and perform P2P connection with the terminal device using the P2P engine.

According to an aspect of the disclosure, a terminal device includes: a communication interface; and at least one processor configured to: receive, through the communication interface, sync complex data or discovery complex data output from an electronic device through a discovery window channel, wherein the sync complex data may include Peer-to-Peer (P2P) Information Element (IE) data added to sync beacon data, and the discovery complex data may include P2P IE data added to discovery beacon data, and based on the terminal device supporting NAN connection, control the communication interface to request a Neighbor Awareness Networking (NAN) service from the electronic device based on the sync beacon data in the sync complex data or the discovery beacon data in the discovery complex data.

The at least one processor may be further configured to, based on the terminal device supporting P2P connection, control the communication interface to request a P2P service from the electronic device based on the P2P IE data in the sync complex data or the discovery complex data.

The P2P IE data may be added to a rear end of the sync beacon data or a rear end of the discovery beacon data.

The sync beacon data and the discovery beacon data may be NAN frame format data, and the at least one processor may be further configured to: based on the terminal device supporting NAN connection, identify type information related to NAN in the sync complex data or the discovery complex data, identify information of the NAN frame format data based on the identified type information related to NAN, and control the communication interface to request an NAN service from the electronic device based on the identified information of the NAN frame format data.

The P2P IE data is P2P frame format data, and the at least one processor may be further configured to: based on the terminal device supporting P2P connection, identify type information related to P2P in the P2P frame format data in the sync complex data or the discovery complex data, identify information of the P2P frame format data based on the identified type information related to P2P, and control the communication interface to request a P2P service from the electronic device based on the identified information of the P2P frame format data.

According to an aspect of the disclosure, a method of controlling an electronic device, includes: maintaining an inactivated state of a Peer-to-Peer (P2P) engine, and controlling a Neighbor Awareness Networking (NAN) engine in an activated state; generating sync complex data for a terminal device to search for the electronic device, by adding P2P Information Element (IE) data to sync beacon data; and outputting the sync complex data using a predetermined cycle in a predetermined discovery window section through a discovery window channel.

The method may further include: generating discovery complex data for the electronic device to search for the terminal device, by adding P2P IE data to discovery beacon data; and outputting the discovery complex data through the discovery window channel.

The generating the sync complex data or the generating the discovery complex data may include adding the P2P IE data to a rear end of the sync beacon data or a rear end of the discovery beacon data.

The method may further include synchronizing the discovery window channel and a P2P listen channel.

The method may further include: based on receiving from the terminal device an NAN service request, performing NAN connection with the terminal device using the NAN engine; and based on receiving from the terminal device a P2P service request, activating the P2P engine and performing P2P connection with the terminal device using the P2P engine.

According to an aspect of the disclosure, a non-transitory computer readable medium has instructions stored therein, which when executed by at least one processor cause the at least one processor to execute a method of controlling an electronic device, the method including: maintaining an inactivated state of a Peer-to-Peer (P2P) engine, and controlling a Neighbor Awareness Networking (NAN) engine in an activated state; generating sync complex data for a terminal device to search for the electronic device, by adding P2P Information Element (IE) data to sync beacon data; and outputting the sync complex data using a predetermined cycle in a predetermined discovery window section through a discovery window channel.

The method may further include: generating discovery complex data for the terminal device to search for the electronic device, by adding P2P IE data to discovery beacon data; and outputting the discovery complex data through the discovery window channel.

The generating the sync complex data or the discovery complex data may further include adding the P2P IE data to a rear end of the sync beacon data or a rear end of the discovery beacon data.

The method may further include synchronizing the discovery window channel and a P2P listen channel.

The method may further include: based on receiving, from the terminal device, an NAN service request, performing NAN connection with the terminal device using the NAN engine; and based on receiving from the terminal device a P2P service request, activating the P2P engine and performing P2P connection with the terminal device using the P2P engine.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7B is a diagram illustrating a P2P IE format according to one or more embodiments of the disclosure;

DETAILED DESCRIPTION

Figure 1:
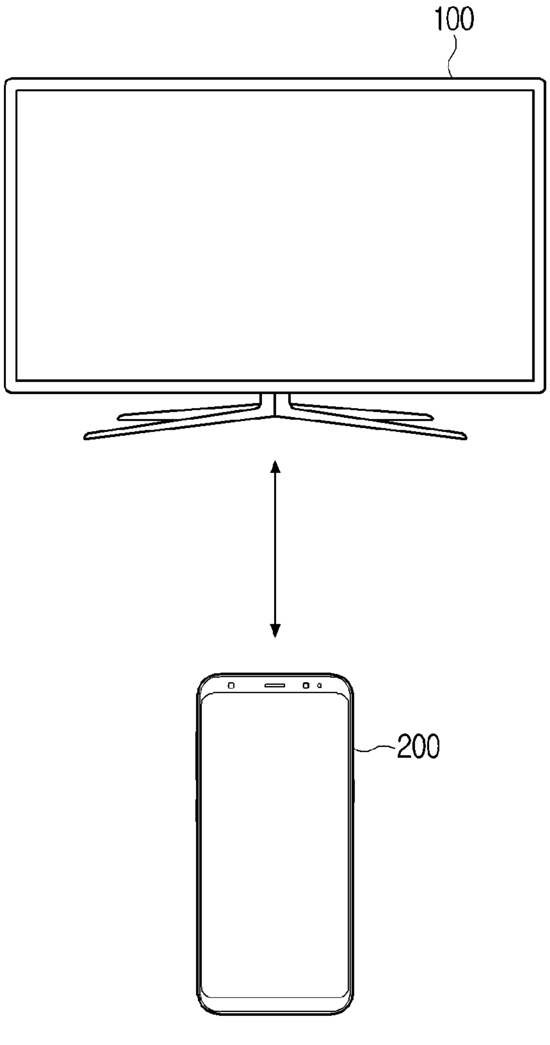
FIG. 1 is a diagram illustrating communicative connection between an electronic device and a terminal device according to one or more embodiments of the disclosure.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are provided for the sole purpose of making the various embodiments more easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as “the first” and “the second” may be used to describe various components, but these components are not limited by the aforementioned terms. The aforementioned terms are used only for the purpose of distinguishing one component from another component.

In addition, in this specification, terms such as "comprise," "include," and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof. Further, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element can be interpreted to mean that still another element does not exist between the one element and the another element.

Herein, "a module" or "a part" for the elements used in this specification performs at least one function or operation. Also, "a module" or "a part" may perform a function or an operation by hardware, software, or a combination of hardware and software. Also, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each operation should be understood in a nonrestrictive way, unless a preceding operation should necessarily be performed prior to a subsequent operation in a logical and temporal sense. That is, excluding an exceptional case as above, even if a process described as a subsequent operation is performed prior to a process described as a preceding operation, there would be no influence on the essence of the disclosure, and the scope of the disclosure should also be defined regardless of the order of operations. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

Further, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

In addition, in describing the disclosure, in case it is determined that detailed explanation of related known functions or features may unnecessarily confuse the gist of the disclosure, the detailed explanation will be abridged or omitted. Meanwhile, each embodiment of the disclosure may be independently implemented or operated, but it may also be implemented or operated in combination with another embodiment.

FIG. 1 is a diagram illustrating communicative connection between an electronic device and a terminal device according to one or more embodiments of the disclosure.

Referring to FIG. 1, an electronic device 100 and a terminal device 200 are illustrated. For example, the electronic device 100 may include a TV, a desktop computer, a laptop computer, a kiosk, etc. The terminal device 200 may include a smartphone, a tablet PC, a laptop computer, a wearable device, etc. The electronic device 100 may support both of a Neighbor Awareness Networking (NAN) (or, Wi-Fi Aware) method and a Peer-to-Peer (P2P) (or, Wi-Fi Direct) method. Accordingly, the electronic device 100 may connect the terminal device 200 by the NAN method or connect the terminal device 200 by the P2P method according to the communication method supported in the terminal device 200. The terminal device 200 may support only the NAN method or support only the P2P method. The electronic device 100 may connect with the terminal device 200 by the NAN method by using an NAN engine, and connect with the terminal device 200 by the P2P method by using a P2P engine.

The electronic device 100 may periodically broadcast a discovery signal so as to connect with a terminal device 200 nearby. For example, the electronic device 100 may periodically broadcast a discovery signal in a predetermined discovery window section through a discovery window channel (e.g., a 2.4 GHz channel 6, 5 GHz channels 44, 48). As an example, the electronic device 100 may broadcast a sync complex data signal as a discovery signal. The sync complex data signal may be a signal including sync beacon data and P2P Information Element (IE) data. The sync beacon data may be data that is output so that the terminal device 200 supporting the NAN communication method can find the electronic device 100, and the P2P IE data may be data that is output so that the terminal device 200 supporting the P2P method can find the electronic device 100. The sync complex data signal may be in a format wherein the P2P IE data is added to the rear end of the sync beacon data area.

Alternatively, the electronic device 100 may broadcast a non-periodical discovery signal, in a case where it is necessary to find a terminal device 200 nearby. As an example, the electronic device 100 may broadcast a discovery complex data signal as a non-periodical discovery signal. The discovery complex data signal may be a signal including discovery beacon data and P2P IE data. The discovery beacon data may be data for finding the terminal device 200 supporting the NAN communication method, and the P2P IE data may be data for finding the terminal device 200 supporting the P2P method. The discovery complex data signal may also be in a format wherein the P2P IE data is added to the rear end of the discovery beacon data area in a similar manner to the sync complex data signal.

If the electronic device 100 periodically outputs a sync complex data signal or non-periodically outputs a discovery complex data signal, the terminal device 200 nearby may receive the sync complex data signal or the discovery complex data signal.

As an example, the terminal device 200 may support only the NAN communication method. When the terminal device 200 is communicatively connected with the electronic device 100, the terminal device 200 may analyze a received sync complex data signal or discovery complex data signal. The terminal device 200 may request communicative connection to the electronic device 100 based on the sync beacon data included in the sync complex data signal or the discovery beacon data included in the discovery complex data signal.

The sync beacon data and the discovery beacon data may be data of an NAN frame format. The terminal device 200 may identify type information related to NAN included in the NAN frame format data in the sync complex data or the discovery complex data. The terminal device 200 may identify information included in the NAN frame format data based on the identified type information related to NAN. The terminal device 200 may request an NAN service to the electronic device 100 based on the identified information of the NAN frame format data.

When the electronic device 100 receives an NAN service request from the terminal device 200, the electronic device 100 may be connected with the terminal device 200 by the NAN communication method through a process of a Neighbor Discovery Protocol (NDP) setup request, a response, and a confirmation. When the electronic device 100 and the terminal device 200 are connected by the NAN communication method, the electronic device 100 may perform an application service.

Alternatively, the terminal device 200 may support only the P2P communication method. When the terminal device 200 is communicatively connected with the electronic device 100, the terminal device 200 may analyze a received sync complex data signal or discovery complex data signal. The terminal device 200 may request communicative connection with the electronic device 100 based on the P2P IE data included in the sync complex data signal or the P2P IE data included in the discovery complex data signal.

The P2P IE data may be data of a P2P frame format. The terminal device 200 may identify type information related to P2P included in the P2P IE data in the sync complex data or the discovery complex data. The terminal device 200 may identify information included in the P2P frame format data based on the identified type information related to P2P. The terminal device 200 may send a P2P service request to the electronic device 100 based on the identified information of the P2P frame format data.

When the electronic device 100 receives a P2P service request from the terminal device 200, the electronic device 100 may be connected with the terminal device 200 by the P2P communication method by proceeding with a P2P Group Formation process through a P2P device address. When the electronic device 100 and the terminal device 200 are connected by the P2P communication method, the electronic device 100 may perform an application service.

Hereinafter, the configurations of the electronic device 100 and the terminal device 200 will be described.

Figure 2:
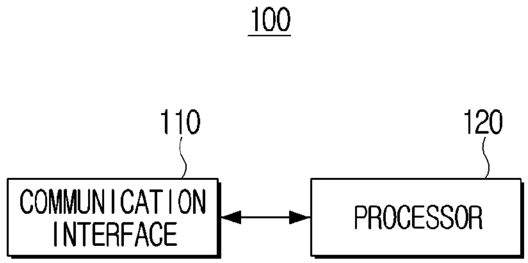
FIG. 2 is a block diagram illustrating a configuration of an electronic device according to one or more embodiments of the disclosure.

FIG. 2 is a block diagram illustrating a configuration of an electronic device according to one or more embodiments of the disclosure.

Referring to FIG. 2, the electronic device 100 may include a communication interface 110 and a processor 120.

The communication interface 110 may perform communication with an external device. As an example, the communication interface 110 may include a Wi-Fi module, and perform communication with the terminal device 200 by at least one communication method among Wi-Fi, Wi-Fi Direct, and Wi-Fi Aware. The communication interface 110 may broadcast the sync complex data or the discovery complex data. For example, the communication interface 110 may broadcast the sync complex data by a predetermined cycle in a predetermined discovery window section through a discovery window channel. Alternatively, the communication interface 110 may non-periodically broadcast the discovery complex data so that the electronic device 100 can find the terminal device 200. The communication interface 110 may receive an NAN service request or a P2P service request from the terminal device 200, and may be connected with the terminal device 200 by the NAN communication method or the P2P communication method according to the received request.

Alternatively, the communication interface 110 may include a broadcasting reception module, a mobile communication module, and a near field communication module. The broadcasting reception module may receive a broadcast signal according to the technical standard of a broadcasting signal (e.g., DVB, ATSC, etc.). The mobile communication module may perform communication with an external device by communication methods such as 3rd Generation (3G), 3rd Generation Partnership Project (3GPP), and Long Term Evolution (LTE), and the near field communication module may include a Bluetooth module, a Zigbee module, an NFC module, etc., and perform communication with an external device according to each communication protocol. The communication interface 110 may also be referred to as a communication device, a communicator, a communication module, a transceiver, etc.

The electronic device 100 may include one or a plurality of processors 120. The processor 120 may control each component of the electronic device 100. For example, the processor 120 may control the communication interface 110 to perform communication with an external device.

The processor 120 may activate the NAN engine. The processor 120 may generate sync complex data for searching the electronic device 100 at the terminal device 200. The sync complex data may be data wherein P2P IE data is added to sync beacon data, and the P2P IE data may be added to the rear end of the sync beacon data area. The processor 120 may control the communication interface 110 to output the sync complex data by the predetermined cycle in the predetermined discovery window section through the discovery window channel. Alternatively, the processor 120 may generate discovery complex data. The discovery complex data may be data for the electronic device 100 to search the terminal device 200. The processor 120 may generate the discovery complex data by adding the P2P IE data to the rear end area of the discovery beacon data. If necessary, the processor 120 may control the communication interface 110 to non-periodically output the generated discovery complex data through the discovery window channel.

The processor 120 may acquire a service request from the terminal device 200 through the communication interface 110.

For example, if the processor 120 receives an NAN service request from the terminal device 200, the processor 120 may perform an NAN connection process with the terminal device 200 by using the NAN engine. For example, the processor 120 may be connected with the terminal device 200 by the NAN communication method through a process of a Neighbor Discovery Protocol (NDP) setup request, a response, and a confirmation. When the electronic device 100 and the terminal device 200 are connected by the NAN communication method, the electronic device 100 may perform an application service.

Alternatively, when the processor 120 receives a P2P service request from the terminal device 200, the processor 120 may perform a P2P connection process with the terminal device 200 by using the P2P engine. For example, the processor 120 may maintain the P2P engine in an inactivated state before the electronic device 100 transmits and receives data with the terminal device 200. When the processor 120 receives a P2P service request from the terminal device 200, the processor 120 may activate the P2P engine. Also, when the processor 120 receives a P2P service request from the terminal device 200, the processor 120 may exchange device-related information with the terminal device 200 through a P2P device address. The processor 120 may determine which device will be the Group Owner, and form a group. The processor 120 may be connected with the terminal device 200 by the P2P communication method by calling a P2P group or making the terminal device 200 participate in the previous P2P group. When the electronic device 100 and the terminal device 200 are connected by the P2P communication method, the electronic device 100 may perform an application service. The processor 120 may receive a request of a P2P service from the terminal device 200 by using a specific channel. A specific channel receiving a request of a P2P service from the terminal device 200 may be referred to as a P2P listen channel. The processor 120 may synchronize the discovery window channel and the P2P listen channel for saving the resource. As an example, the processor 120 may set the discovery window channel and the P2P listen channel to be the same as a 2.4 GHz channel 6.

The terminal device 200 may also include similar components to those of the electronic device 100. That is, the terminal device 200 may also include a communication interface and a processor.

The communication interface of the terminal device 200 may perform communication with the electronic device 100. For example, the communication interface may receive the sync complex data or the discovery complex data output from the electronic device 100 through the discovery window channel. Then, the communication interface may request an NAN service or a P2P service from the electronic device 100 according to the communication method supported by the terminal device 200.

The terminal device 200 may also include one or a plurality of processors. The processor of the terminal device 200 may control each component of the terminal device 200. The processor may control the communication interface to request an NAN service or a P2P service from the electronic device 100.

If the terminal device 200 is a terminal device supporting NAN connection, the processor may control the communication interface to request an NAN service from the electronic device 100 based on sync beacon data included in the received sync complex data or discovery beacon data included in the discovery complex data. The sync beacon data and the discovery beacon data may be NAN frame format data. The processor may identify type information related to NAN included in the NAN frame format data in the sync complex data or the discovery complex data. Then, the processor may identify information of the NAN frame format data based on the identified type information related to NAN. The processor may control the communication interface to request an NAN service from the electronic device 100 based on the identified information of the NAN frame format data.

Alternatively, if the terminal device 200 is a terminal device supporting P2P connection, the processor may control the communication interface to request a P2P service from the electronic device 100 based on P2P IE data included in the received sync complex data or discovery complex data. The P2P IE data may be P2P frame format data. The processor may identify type information related to P2P included in the P2P frame format data in the sync complex data or the discovery complex data. Then, the processor may identify information of the P2P frame format data based on the identified type information related to P2P. The processor may control the communication interface to request a P2P service from the electronic device 100 based on the identified information of the P2P frame format data.

Figure 3:
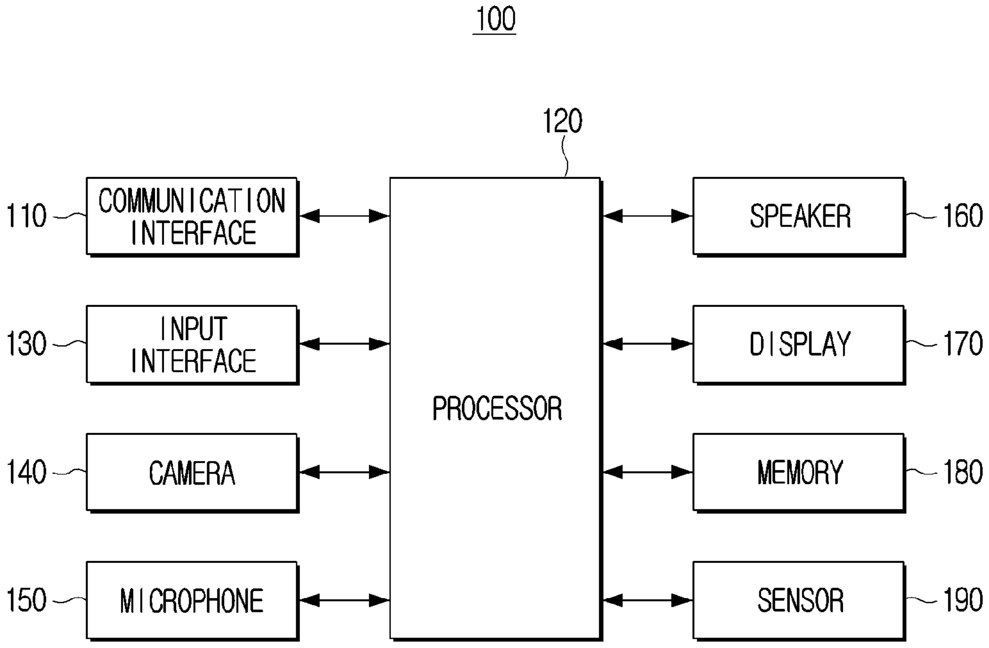
FIG. 3 is a block diagram illustrating a detailed configuration of an electronic device according to one or more embodiments of the disclosure.

FIG. 3 is a block diagram illustrating a detailed configuration of an electronic device according to one or more embodiments of the disclosure.

Referring to FIG. 3, the electronic device 100 may include a communication interface 110, a processor 120, an input interface 130, a camera 140, a microphone 150, a speaker 160, a display 170, a memory 180, and a sensor 190. The communication interface 110 may be identical to what was described in FIG. 2.

The input interface 130 may receive input of a control instruction from a user. For example, the input interface 130 may receive input of a control instruction, a selection instruction, an input instruction, etc. For example, the input interface 130 may include a keyboard, buttons, a keypad, a touch pad, and a touch screen. Alternatively, the input interface 130 may be implemented as an input/output port. In this case, the input interface 130 may be referred to as an input/output interface. In case the input interface 130 is implemented as an input/output port, the input/output port may include a high-definition multimedia interface (HDMI), a display port (DP), an RGB, a digital visual interface (DVI), a universal serial bus (USB), a Thunderbolt, an audio jack, a video jack, etc. The input interface 130 may be referred to as an input device, an inputter, an input module, etc., and in case the input interface 130 is implemented as an input/output port, it may be referred to as an input/output device, an inputter/outputter, an input/output module, etc.

The camera 140 may acquire an image by photographing the surrounding environment. An image may include a static image including one frame and a dynamic image including a plurality of frames. For example, the camera 140 may include an RGB camera, a depth camera, a wide angle camera, a telephoto camera, etc.

The microphone 150 may receive input of a sound of the surrounding environment or a user's voice. The processor 120 may identify a sound or a voice signal that was input, and perform an operation corresponding to the input sound or voice signal. For example, the microphone 150 may include a general microphone, a surround microphone, a directional microphone, etc.

The speaker 160 may output a sound signal. For example, the speaker 160 may output information on a user's input instruction, information related to a warning, information related to an operation, notification information, etc. as a voice or a notification sound.

The display 170 may output data processed at the processor 120 as an image. The display 170 may display a received image through the communication interface 110 or the input interface 130, and display the stored image. Alternatively, the display 170 may display notification information, etc. For example, the display 170 may be implemented as a liquid crystal display (LCD), organic light emitting diodes (OLED), a flexible display, a touch screen, etc. In case the display 170 is implemented as a touch screen, the electronic device 100 may receive input of a control instruction through the touch screen.

The memory 180 may store data, an algorithm, etc. performing the functions of the electronic device 100, and store programs, instructions, etc. driven at the electronic device 100. For example, the memory 180 may store data or an algorithm for supporting connection of NAN communication, and store data or an algorithm for supporting connection of P2P communication. The algorithm or data stored in the memory 180 may be loaded on the processor 120 by control by the processor 120, and perform related functions. For example, the memory 180 may be implemented as types such as a ROM, a RAM, an HDD, an SSD, a memory card, etc.

The sensor 190 may detect the surrounding environment of the electronic device 100. For example, the sensor 190 may include an angle sensor, an acceleration sensor, a gravity sensor, a gyro sensor, a geomagnetic sensor, a direction sensor, an infrared sensor, an ultrasonic sensor, a Time-of-Flight (ToF), a LiDAR, a laser sensor, a motion recognition sensor, a heat detection sensor, an image sensor, a tracking sensor, a proximity sensor, an illumination sensor, a voltmeter, an ammeter, a barometer, a hygrometer, a thermometer, a touch sensor, etc.

Also, the terminal device 200 may include similar components to those of the electronic device 100. That is, the terminal device 200 may also include a communication interface 110, a processor 120, an input interface 130, a camera 140, a microphone 150, a speaker 160, a display 170, a memory 180, and a sensor 190, and perform similar functions to the aforementioned functions. The electronic device 100 and the terminal device 200 may include all of the aforementioned components, or include some components.

So far, the configuration of the electronic device 100 was described. Hereinafter, a process of communicative connection between the electronic device 100 and the terminal device 200 will be described.

Figure 4A:
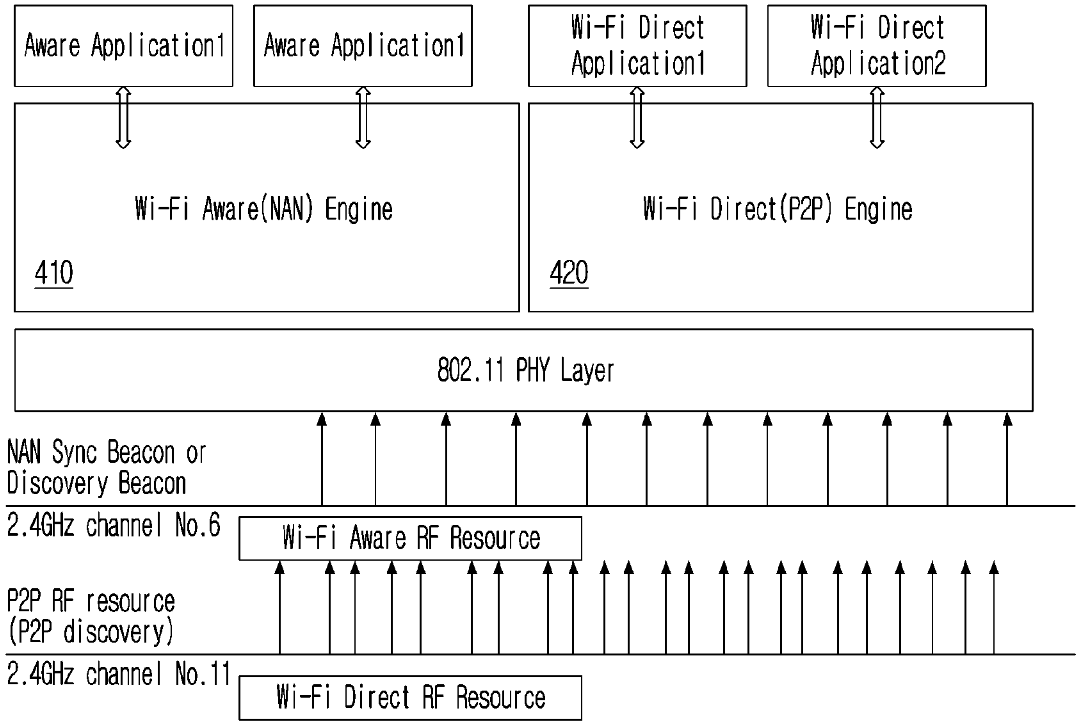
FIG. 4A and FIG. 4B are diagrams illustrating an embodiment of a related technology regarding a method of communicative connection.
Figure 4B:
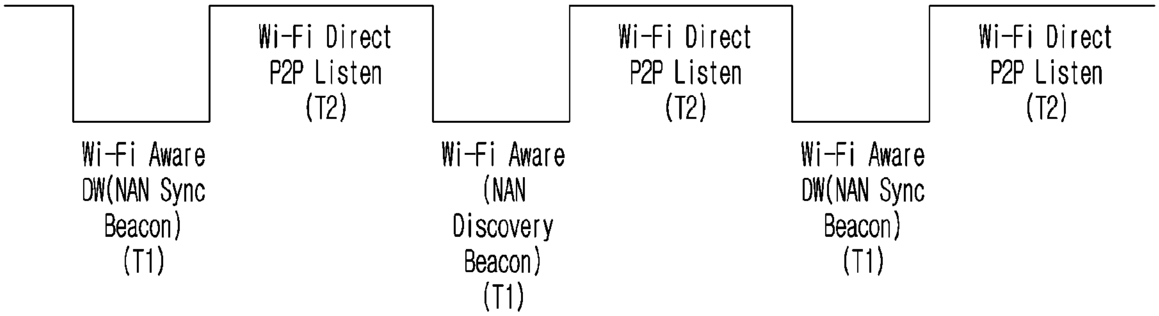

FIG. 4A and FIG. 4B are diagrams illustrating an embodiment of a related technology regarding a method of communicative connection.

Referring to FIG. 4A, a configuration of an electronic device according to a related technology is illustrated. The electronic device may support an NAN connection method and a P2P connection method. The MAC protocols of Wi-Fi Aware (NAN) and Wi-Fi Direct (P2P) are different MAC protocols, and are not inter-compatible. Accordingly, in order that the electronic device can perform operations of searching for and connecting with an external device, it should include respective protocol stacks that are called a Wi-Fi Aware (NAN) engine and a Wi-Fi Direct (P2P) engine (e.g., Wi-Fi Aware (NAN) engine 410 and Wi-Fi Direct (P2P) engine 420). The electronic device should provide separate RF resources for operating the different MAC protocols.

For example, in the case of Wi-Fi Aware (NAN), according to the standard specification of a protocol including a discovery, the electronic device should periodically transmit Wi-Fi Aware (NAN) information on 2.4 GHz, channel 6. Accordingly, the electronic device transmits sync beacon data by a specific cycle per specific duration which is a discovery window. Also, in case the electronic device is a master device, it transmits an NAN discovery beacon. In the case of W-Fi Direct, the electronic device should occupy a channel on 2.4 GHz, channels 1, 6, and 11, or a channel wherein P2P is allowed among 5 GHz channels, and convert into a standby state for receiving a search signal which is a P2P listen. The electronic device may respond to a search signal of an external device supporting a Wi-Fi Direct method in a standby state for reception, and perform a Wi-Fi Direct connection process to perform a service based on Wi-Fi Direct.

As illustrated in FIG. 4B, an electronic device supporting the Wi-Fi Direct communication method and the Wi-Fi Aware method should transmit a sync beacon or a discovery beacon for an external device supporting Wi-Fi Aware in T1 time, and maintain a standby state for receiving a search signal for an external device supporting Wi-Fi Direct in T2 time.

Accordingly, an electronic device according to a related technology has a problem that it should always occupy an RF resource, and should always maintain a Wi-Fi Aware engine and a Wi-Fi Direct engine in an activated state. Also, in case a channel transmitting Wi-Fi Aware information (e.g., 2.4 GHz, channel 6) and a channel in a standby state for receiving Wi-Fi Direct (e.g., 2.4 GHz, channel 11) are different, as RF wireless channel switching repeatedly occurs, there is a problem that the performance is degraded and the service quality is degraded.

Figure 5:
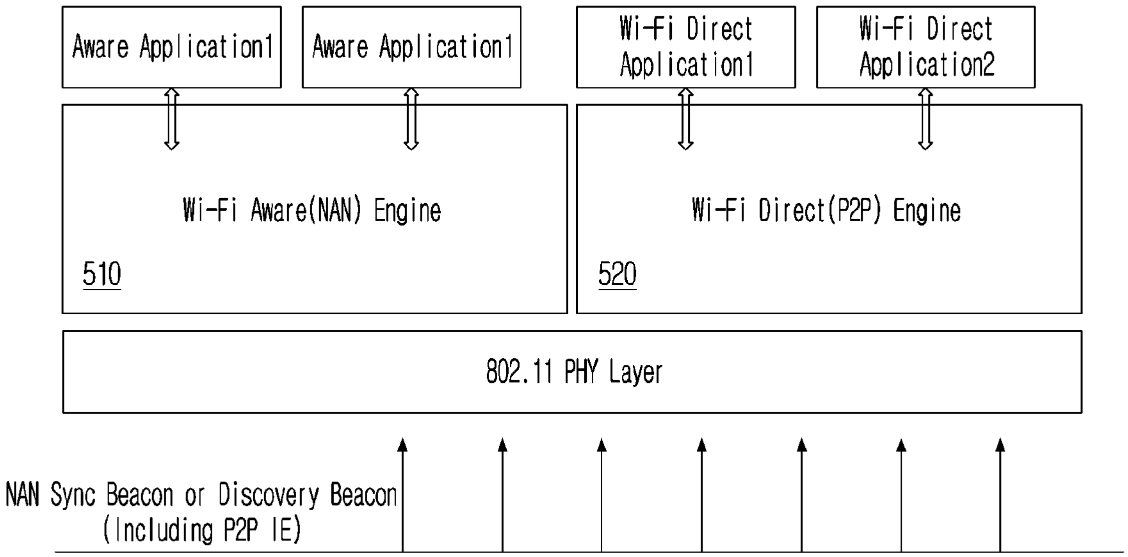
FIG. 5 is a diagram illustrating an NAN connection process according to one or more embodiments of the disclosure.

FIG. 5 is a diagram illustrating an NAN connection process according to one or more embodiments of the disclosure.

Referring to FIG. 5, a configuration of the electronic device 100 according to the disclosure transmitting a search signal is illustrated. The electronic device 100 supporting both of NAN (Wi-Fi Aware) and P2P (Wi-Fi Direct) may include a W-Fi Aware engine 510 and a Wi-Fi Direct engine 520. The electronic device 100 may activate (turn-on) the Wi-Fi Aware engine 510 and inactivate (turn-off or maintain an off state) the Wi-Fi Direct engine 520.

The electronic device 100 may generate sync complex data wherein P2P IE data is added to sync beacon data. Alternatively, the electronic device 100 may generate discovery complex data wherein P2P IE data is added to discovery beacon data. For example, the P2P IE data may be added to the rear end of the area of the sync beacon data or the rear end of the area of the discovery beacon data. The electronic device 100 may transmit the generated sync complex data or discovery complex data. For example, the electronic device 100 may transmit the sync complex data by a specific cycle per specific duration which is a discovery window. Alternatively, in case the electronic device 100 is the master device, it may transmit the discovery complex data. Also, the electronic device 100 may synchronize the discovery window channel and a P2P listen channel (e.g., 2.4 GHz, channel 6).

When the electronic device 100 receives an NAN service request from the terminal device 200, it may perform an NAN connection process with the terminal device 200 by using the NAN engine. That is, the electronic device 100 may be connected with the terminal device 200 by the NAN communication method through a process of an NDP setup request, a response, and a confirmation. When the electronic device 100 and the terminal device 200 are connected by the NAN communication method, the electronic device 100 may perform an NAN application service. Here, the P2P engine may maintain an inactivated state.

The electronic device 100 according to the disclosure may occupy the RF resource only when transmitting the beacon data. Also, when the electronic device 100 transmits the beacon data, the Wi-Fi Direct engine (e.g., engine 420/520) is in an inactivated state, and the discovery window channel and a P2P listen channel are synchronized, and accordingly, there is no RF wireless channel switching, and thus the performance and the service quality can be improved.

Alternatively, the electronic device 100 may receive a P2P service request from the terminal device 200.

Figure 6:
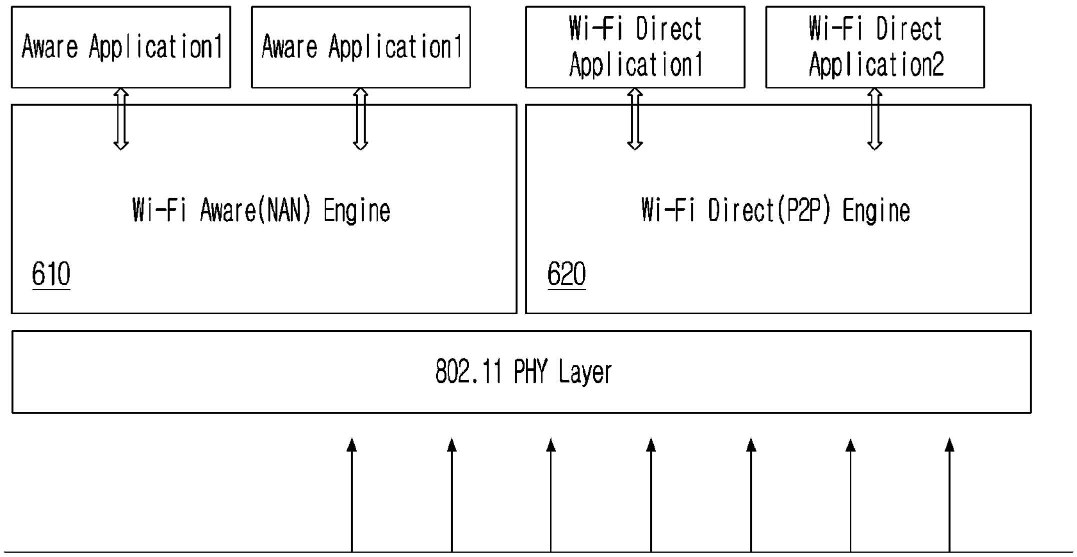
FIG. 6 is a diagram illustrating a P2P connection process according to one or more embodiments of the disclosure.

FIG. 6 is a diagram illustrating a P2P connection process according to one or more embodiments of the disclosure.

As illustrated in FIG. 6, if a service requested by the terminal device 200 is a P2P service, the electronic device 100 may activate the P2P engine 620. Then, the electronic device 100 may perform a P2P connection process with the terminal device 200 by using the activated P2P engine 620. That is, the electronic device 100 may proceed with a P2P group formation process through a P2P device address, and may be connected with the terminal device 200 by the P2P communication method. When the electronic device 100 and the terminal device 200 are connected by the P2P communication method, the electronic device 100 may perform a P2P application service.

Figure 7A:
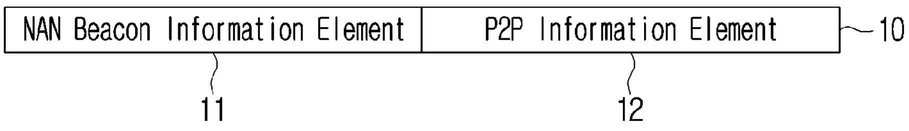
FIG. 7A is a diagram illustrating complex data according to one or more embodiments of the disclosure.

FIG. 7A is a diagram illustrating complex data according to one or more embodiments of the disclosure, and FIG. 7B is a diagram illustrating a P2P IE format according to one or more embodiments of the disclosure. Hereinafter, explanation will be described with reference to both of FIG. 7A and FIG. 7B.

The electronic device 100 may generate complex data 10 wherein P2P IE data 12 is added to NAN beacon data 11. The P2P IE data 12 may be added to the rear end of the area of the NAN beacon data 11. As an example, the format of the P2P IE data may be the format illustrated in FIG. 7B. The NAN beacon data 11 may be sync beacon data or discovery beacon data. If the NAN beacon data 11 is sync beacon data, the generated complex data 10 may be sync complex data. If the NAN beacon data 11 is discovery beacon data, the generated complex data 10 may be discovery complex data. The sync complex data may be transmitted by a specific cycle in a discovery window section. In case the electronic device 100 is the master device, the electronic device 100 may transmit the discovery complex data.

The terminal device 200 may receive the sync complex data or the discovery complex data, and may be communicatively connected with the electronic device 100 according to the communication method supported by the terminal device 200.

Figure 8:
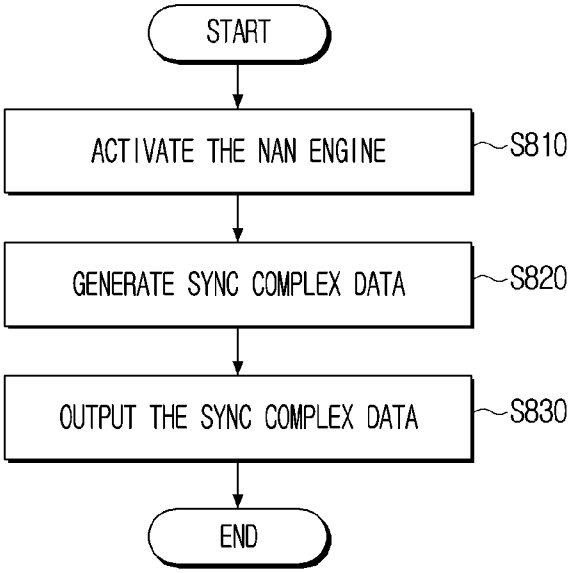
FIG. 8 is a flow chart illustrating a controlling method for an electronic device according to one or more embodiments of the disclosure.

FIG. 8 is a flow chart illustrating a controlling method for an electronic device according to one or more embodiments of the disclosure.

Referring to FIG. 8, the electronic device may activate the NAN engine in operation S810. Here, the electronic device may inactivate (or, maintain an inactivated state) the P2P engine.

The electronic device may generate sync complex data in operation S820. Meanwhile, the sync beacon data may be data for the terminal device to search the electronic device. The electronic device may generate sync complex data by adding the P2P IE data to the sync beacon data. Alternatively, in case the electronic device is the master device, the electronic device may generate discovery complex data. Meanwhile, the discovery beacon data may be data for the electronic device to search for the terminal device. The electronic device may generate discovery complex data by adding the P2P IE data to the discovery beacon data. As an example, the P2P IE data may be added to the rear end of the sync beacon data or the discovery beacon data.

The electronic device may output the generated sync complex data in operation S830. The electronic device may output the generated sync complex data by a predetermined cycle in a predetermined discovery window section through a discovery window channel. Alternatively, the electronic device may non-periodically output the generated discovery complex data through the discovery window channel. The electronic device may synchronize the discovery window channel and a P2P listen channel.

When the electronic device receives an NAN service request from the terminal device, the electronic device may perform an NAN connection process with the terminal device by using the NAN engine. Alternatively, if the electronic device receives a P2P service request from the terminal device, the electronic device may activate the P2P engine, and perform a P2P connection process with the terminal device by using the P2P engine.

Figure 9:
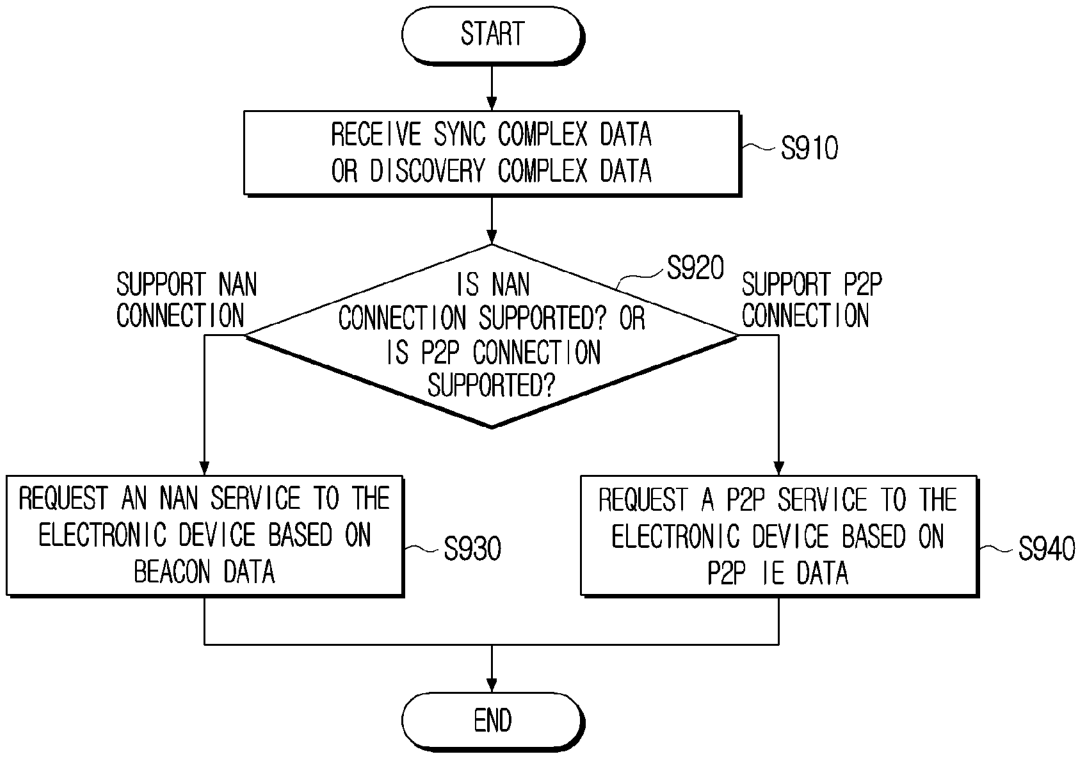
FIG. 9 is a flow chart illustrating a controlling method fora terminal device according to one or more embodiments of the disclosure.

FIG. 9 is a flow chart illustrating a controlling method for a terminal device according to one or more embodiments of the disclosure.

Referring to FIG. 9, the terminal device may receive sync complex data or discovery complex data output from the electronic device in operation S910. For example, the sync complex data may be data wherein P2P IE data is added to sync beacon data, and the discovery complex data may be data wherein P2P IE data is added to discovery beacon data.

In the terminal device, it may be determined whether the device is a terminal device supporting NAN connection or a terminal device supporting P2P connection in operation S920.

If the terminal device is a terminal device supporting NAN connection, the terminal device may request an NAN service from the electronic device based on the sync beacon data included in the received sync complex data or the discovery beacon data included in the discovery complex data in operation S930. For example, the sync beacon data and the discovery beacon data may be NAN frame format data. The terminal device may identify type information related to NAN included in the NAN frame format data in the sync complex data or the discovery complex data. The terminal device may identify information of the NAN frame format data based on the identified type information related to NAN. The terminal device may request an NAN service from the electronic device based on the identified information of the NAN frame format data.

If the terminal device is a terminal device supporting P2P connection, the terminal device may request a P2P service from the electronic device based on the P2P IE data included in the received sync complex data or discovery complex data in operation S940. For example, the P2P IE data may be P2P frame format data. The terminal device may identify type information related to P2P included in the P2P frame format data in the sync complex data or the discovery complex data. The terminal device may identify information of the P2P frame format data based on the identified type information related to P2P. The terminal device may request a P2P service from the electronic device based on the identified information of the P2P frame format data.

Figure 10:
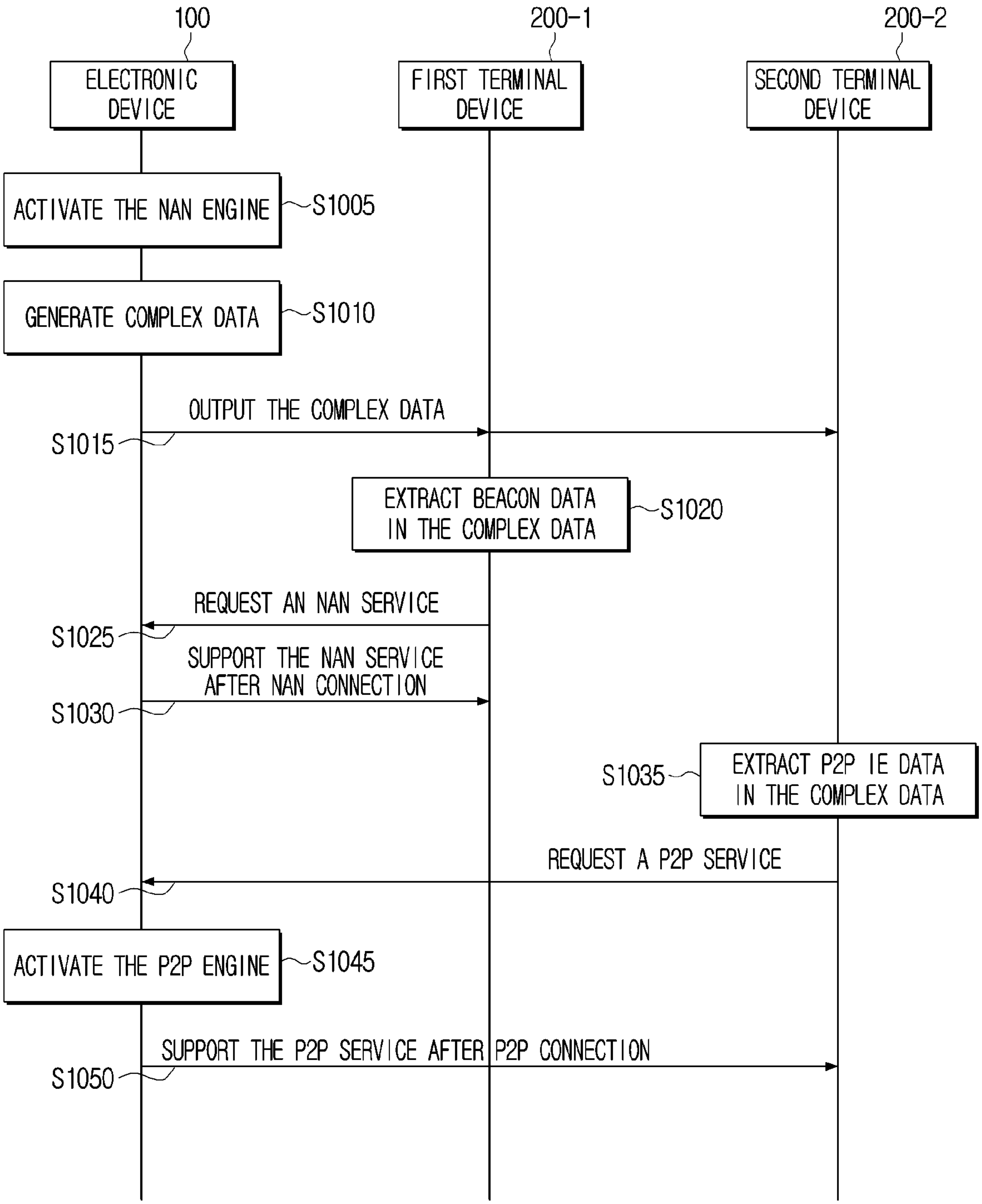
FIG. 10 is a timing diagram illustrating a connection process between an electronic device and a terminal device according to one or more embodiments of the disclosure.

FIG. 10 is a timing diagram illustrating a connection process between an electronic device and a terminal device according to one or more embodiments of the disclosure.

Referring to FIG. 10, the electronic device 100 may activate an NAN engine in operation S1005. Then, the electronic device 100 may generate complex data in operation S1010. For example, the electronic device 100 may generate sync complex data by adding P2P IE data to sync beacon data. Alternatively, the electronic device 100 may generate discovery complex data by adding P2P IE data to discovery beacon data.

The electronic device 100 may output the generated complex data in operation S1015. For example, the electronic device 100 may broadcast sync complex data by a predetermined cycle in a predetermined discovery window section through a discovery window channel. Alternatively, the electronic device may non-periodically output the generated discovery complex data through the discovery window channel. The electronic device may synchronize the discovery window channel and a P2P listen channel.

The first terminal device 200-1 and the second terminal device 200-2 may receive the complex data output from the electronic device 100. For example, the first terminal device 200-1 may be a terminal device supporting the NAN communication method, and the second terminal device 200-2 may be a terminal device supporting the P2P communication method.

When the first terminal device 200-1 receives the complex data, it may extract beacon data in the received complex data in operation S1020. For example, the first terminal device 200-1 may extract sync beacon data from the sync complex data, and extract discovery beacon data from the discovery complex data. The first terminal device 200-1 may request an NAN service from the electronic device 100 based on the extracted beacon data in operation S1025. When the electronic device 100 receives an NAN service request from the first terminal device 200-1, the electronic device 100 may perform an NAN connection process with the first terminal device 200-1 by using the NAN engine. The electronic device 100 may support the NAN service after being connected with the first terminal device 200-1 by the NAN communication method in operation S1030.

When the second terminal device 200-2 receives the complex data, it may extract P2P IE information in the received complex data in operation S1035. The second terminal device 200-2 may request a P2P service from the electronic device 100 based on the extracted P2P IE data in operation S1040. When the electronic device 100 receives a P2P service request from the second terminal device 200-2, the electronic device 100 may activate the P2P engine in operation S1045. The electronic device 100 may perform a P2P connection process with the second terminal device 200-2 by using the P2P engine. The electronic device 100 may support the P2P service after being connected with the second terminal device 200-2 by the P2P communication method in operation S1050.

Meanwhile, the effects according to the disclosure are not limited to the effects mentioned above, and other effects that were not mentioned could be clearly understood by a person skilled in the art from the aforementioned descriptions.

Also, the controlling method for an electronic device according to the aforementioned various embodiments may be provided as a computer program product. A computer program product may include a software program itself or a non-transitory computer readable medium storing a software program.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Further, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a communication interface;
memory storing instructions; and
at least one processor,
wherein the instructions, when executed by the at least one processor individually or collectively, cause the electronic device to:
maintain an inactivated state of a Peer-to-Peer (P2P) engine, and control a Neighbor Awareness Networking (NAN) engine in an activated state,
generate sync complex data for a terminal device to search for the electronic device, by adding P2P Information Element (IE) data to sync beacon data,
control the communication interface to output the sync complex data using a predetermined cycle in a predetermined discovery window section through a discovery window channel,
based on receiving, from the terminal device through the communication interface, a NAN service request, perform NAN connection with the terminal device using the NAN engine, and
based on receiving, from the terminal device through the communication interface, a P2P service request, activate the P2P engine and perform P2P connection with the terminal device using the P2P engine.

2. The electronic device of claim 1, wherein the instructions, when executed by the at least one processor individually or collectively, further cause the electronic device to:
generate discovery complex data for the electronic device to search for the terminal device, by adding P2P IE data to discovery beacon data, and
control the communication interface to output the discovery complex data through the discovery window channel.

3. The electronic device of claim 2, wherein the instructions, when executed by the at least one processor individually or collectively, further cause the electronic device to:
add the P2P IE data to a rear end of the sync beacon data or a rear end of the discovery beacon data.

4. The electronic device of claim 2, wherein the instructions, when executed by the at least one processor individually or collectively, further cause the electronic device to:
synchronize the discovery window channel and a P2P listen channel.

5. A terminal device comprising:
a communication interface;
memory storing instructions; and
at least one processor,
wherein the instructions, when executed by the at least one processor individually or collectively, cause the terminal device to:
receive, through the communication interface, sync complex data or discovery complex data output from an electronic device through a discovery window channel, wherein the sync complex data comprises Peer-to-Peer (P2P) Information Element (IE) data added to sync beacon data, and the discovery complex data comprises P2P IE data added to discovery beacon data,
based on the terminal device supporting NAN connection, control the communication interface to request a Neighbor Awareness Networking (NAN) service from the electronic device based on the sync beacon data in the sync complex data or the discovery beacon data in the discovery complex data, and
based on the terminal device supporting P2P connection, control the communication interface to request a P2P service from the electronic device based on the P2P IE data in the sync complex data or the discovery complex data.

6. The terminal device of claim 5, wherein the P2P IE data is added to a rear end of the sync beacon data or a rear end of the discovery beacon data.

7. The terminal device of claim 5, wherein the sync beacon data and the discovery beacon data are NAN frame format data, and
wherein the instructions, when executed by the at least one processor individually or collectively, further cause the terminal device to:

based on the terminal device supporting NAN connection, identify type information related to NAN in the sync complex data or the discovery complex data, identify information of the NAN frame format data based on the identified type information related to NAN, and control the communication interface to request a NAN service from the electronic device based on the identified information of the NAN frame format data.

8. The terminal device of claim 5, wherein the P2P IE data is P2P frame format data, and wherein the instructions, when executed by the at least one processor is individually or collectively, further cause the terminal device to:

based on the terminal device supporting P2P connection, identify type information related to P2P in the P2P frame format data in the sync complex data or the discovery complex data, identify information of the P2P frame format data based on the identified type information related to P2P, and control the communication interface to request a P2P service from the electronic device based on the identified information of the P2P frame format data.

9. A method of controlling an electronic device, the method comprising:

maintaining an inactivated state of a Peer-to-Peer (P2P) engine, and controlling a Neighbor Awareness Networking (NAN) engine in an activated state;

generating sync complex data for a terminal device to search for the electronic device, by adding P2P Information Element (IE) data to sync beacon data;

outputting the sync complex data using a predetermined cycle in a predetermined discovery window section through a discovery window channel;

based on receiving from the terminal device a NAN service request, performing NAN connection with the terminal device using the NAN engine; and based on receiving from the terminal device a P2P service request, activating the P2P engine and performing P2P connection with the terminal device using the P2P engine.

10. The method of claim 9, further comprising:

generating discovery complex data for the electronic device to search for the terminal device, by adding P2P IE data to discovery beacon data; and outputting the discovery complex data through the discovery window channel.

11. The method of claim 10, wherein the generating the sync complex data or the generating the discovery complex data comprises:

adding the P2P IE data to a rear end of the sync beacon data or a rear end of the discovery beacon data.

12. The method of claim 10, further comprising:

synchronizing the discovery window channel and a P2P listen channel.

* * * * *